(12) United States Patent
Nguyen

(10) Patent No.: US 8,288,670 B2
(45) Date of Patent: Oct. 16, 2012

(54) ELECTRIC DEADMAN SWITCH FOR BLAST SYSTEM

(76) Inventor: Phuong Taylor Nguyen, Richmond, TX (US)

( * ) Notice: Subject to any disclaimer, the term of this patent is extended or adjusted under 35 U.S.C. 154(b) by 141 days.

(21) Appl. No.: 12/699,656

(22) Filed: Feb. 3, 2010

(65) Prior Publication Data

US 2011/0186410 A1    Aug. 4, 2011

(51) Int. Cl.
*H01H 3/04* (2006.01)
(52) U.S. Cl. ........................................................ 200/335
(58) Field of Classification Search ................... 200/335, 200/557
See application file for complete search history.

(56) References Cited

U.S. PATENT DOCUMENTS

| | | | |
|---|---|---|---|
| 3,767,881 A * | 10/1973 | Sharples | 200/332 |
| 3,846,603 A * | 11/1974 | Houser | 200/458 |
| 6,752,816 B2 * | 6/2004 | Culp et al. | 606/170 |

* cited by examiner

*Primary Examiner* — Vanessa Girardi

(57) ABSTRACT

An electric deadman switch includes a body having a cavity, with an activation switch adapted to be placed in the cavity, and an electrical cord assembly having conductor wires adapted to be connected to the switch, wherein activation of the switch closes an electrical circuit and deactivation of the switch opens the electrical circuit, the electrical cord assembly having an end adapted to be carried in the cavity. A removable body cover is adapted to be placed over the body cavity for securing the electrical cord assembly and the activation switch in the body. The body cavity includes a seat for receiving a mated member and the electrical cord assembly includes the mated member whereby the mated member is seated in the seat when the electrical cord assembly is carried in the cavity to secure the electrical cord assembly in a non-rotating relationship with the body.

3 Claims, 5 Drawing Sheets

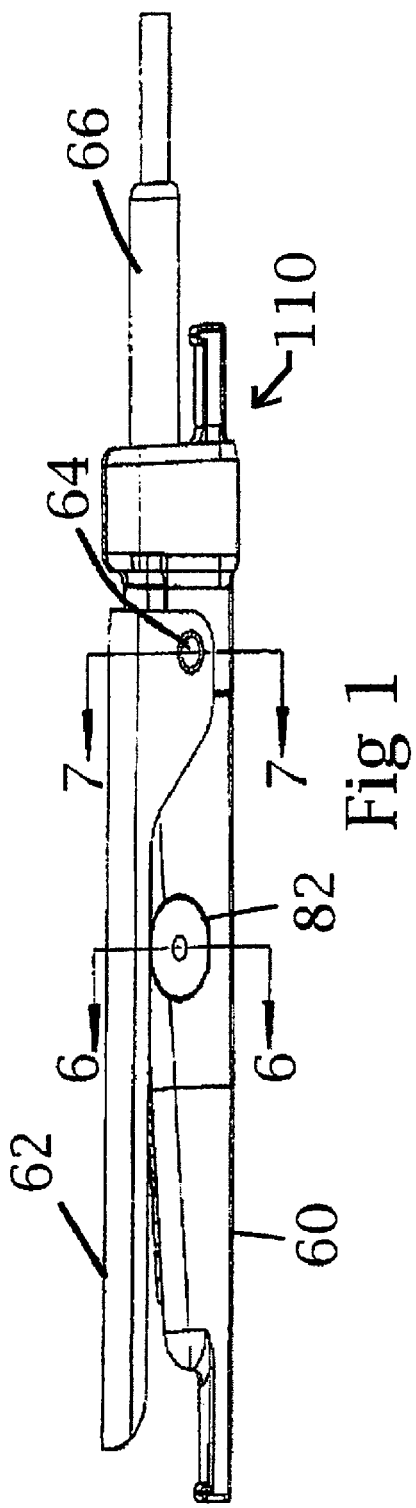
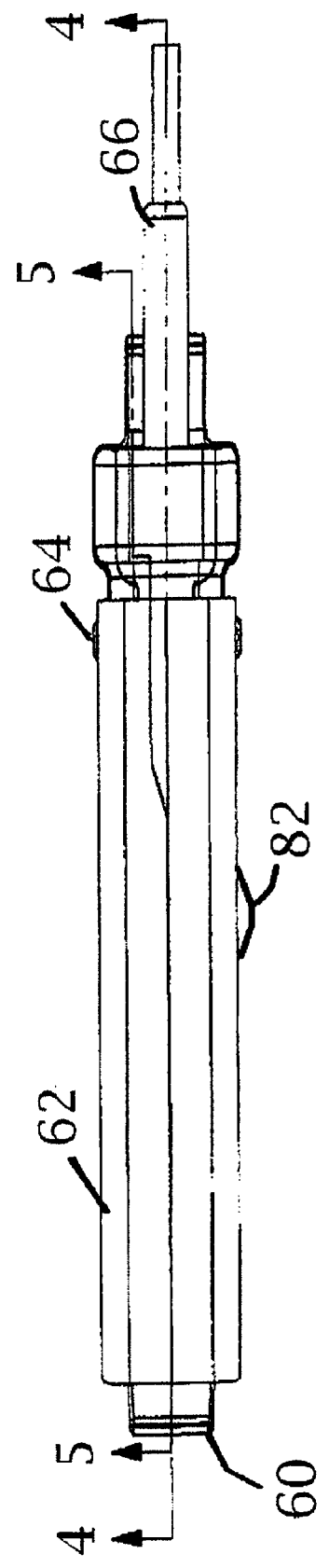

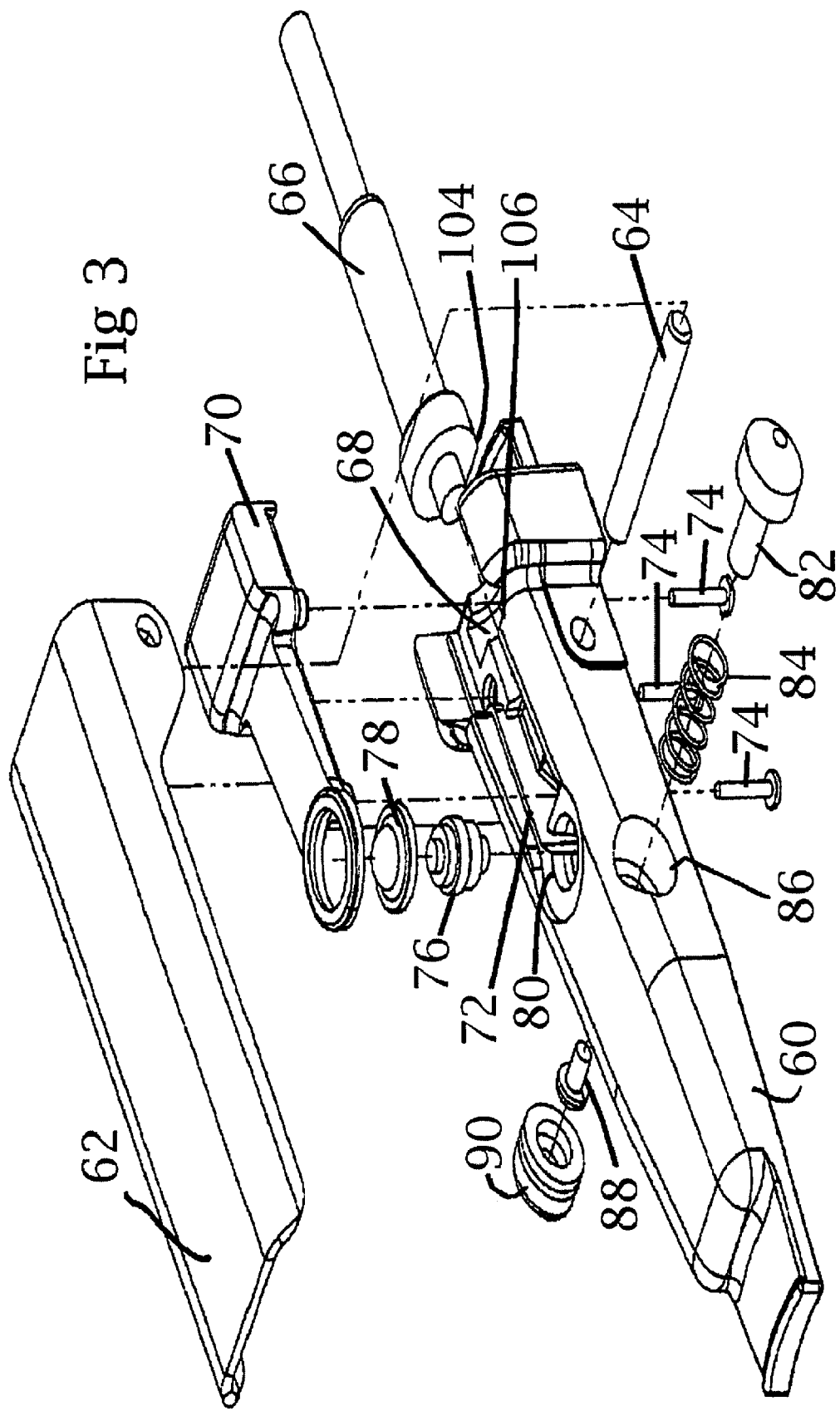

ELECTRIC DEADMAN SWITCH FOR BLAST SYSTEM

FIELD OF THE INVENTION

The invention is generally directed to a remotely located manually operable control switch for operating blast systems and is specifically directed to a modular electric deadman switch.

DISCUSSION OF THE PRIOR ART

Deadman valves or switches are generally well known, and are used in a wide variety of industrial applications to operate devices or to prevent the operation of such devices. In fact, the Occupational Health and Safety Organization (OSHA) requires a safety system on all abrasive blasting equipment as well as on other equipment. Such safety systems usually include what is referred to in the art as a "deadman control." A deadman control is a device that stops the machinery when the control is released. As is well known, these controls have been implemented as mechanical, pneumatic and electric deadman controls. In general, these valves or switches require prolonged engagement or actuation by a user who for one reason or another has part of his or her attention distracted from operation of the switch. Specifically, the operator is often focused on the operation of the system and takes the operability of the switch for granted. The deadman control increases the safety of the operation by requiring that the switch be actively engaged in order for the system to be "on."

The deadman switches are designed to function in a fail-safe mode wherein the switch is automatically in the off position when certain conditions are not met. Typically, the failure to apply operating stimulus to the switch results in an immediate signal to shutdown.

In a typical operation, a pneumatic deadman control system does not shut the system down immediately because of the inherent speed a pneumatic signal. The line, which could be 100 feet long, has to depressurize or vent, as well as the air cylinders in the air blast switches. While the action of the deadman venting or signal to shutoff is immediate, the time response from the air blast switch is proportional to the length of signal line and the volume of the actuating cylinder or volume.

Such switches and valves are provided in many industrial applications such as blasting systems, power tools, industrial equipment and machinery and the like. The deadman switches are designed to prevent movement of the control device when the operator's attention is distracted from such a device. These switches permit operation of the device only when they are engaged and otherwise prevent the transmission of electrical, pneumatic, or hydraulic power to valves and other devices required to operate the machine.

The standard deadman switch comprises a simple push-button switch which is spring biased into its open position and which must be depressed into its actuated or closed position permitting operation of the device on which it is mounted. The typical switch is difficult to depress for extended periods of time because of fatigue.

One type of actuator for a deadman switch is the "mushroom" switch which requires less accurate positioning of the operator's hand. Another widely used configuration is the use of a control lever which is connected to the device on which the switch is mounted and which extends over the switch by a substantial distance and which may thus be more easily actuated. One such control lever is disclosed in U.S. Pat. No. 4,270,032, which issued to Dobberpuhl on May 26, 1981. The device is operated by deflecting the control lever against the biasing force of a return spring into contact with the switch, thus depressing and closing the switch and permitting operation of the machine. When the operator's hand is removed from the lever, the lever is returned to its initial position under the biasing force of the return spring, thus opening the switch and deactivating the device. Movement of the control lever in both directions is limited by a return stop.

An improvement in the pneumatic deadman control switch is shown and described in my co-pending application, U.S. Ser. No. 11/338,154 filed on Jan. 24, 2006, entitled: "Ergonomic Pneumatic Deadman Valve". That switch incorporates an ergonomic design that decreases the fatigue factor encountered when using many of the prior art switches.

A prior art electric deadman switch is offered by Axxiom Manufacturing, Inc., the assignee of the subject application, and is shown in FIGS. 9 and 10 of the accompanying drawing. While this switch meets many of the desired operational characteristics of a deadman control switch, it does not incorporate the desirable ergonomic features described in the aforementioned pending application, and it is cumbersome to manufacture, assemble and service.

SUMMARY OF THE INVENTION

The subject invention is directed to a modular deadman control switch of an ergonomic design to provide enhanced user comfort as well as to improve design efficiency and ease of manufacture.

In the preferred embodiment the electric deadman switch includes a body having a cavity, with the activation switch adapted to be placed in the cavity, and an electrical cord assembly having conductor wires adapted to be connected to the switch, wherein activation of the switch closes an electrical circuit and deactivation of the switch opens the electrical circuit, the electrical cord assembly having an end adapted to be carried in the cavity. A removable body cover is adapted to be placed over the body cavity for securing the electrical cord assembly and the activation switch in the body.

In the preferred embodiment, the body cavity includes a seat for receiving a mated member and the electrical cord assembly further including the mated member whereby the mated member is seated in the seat when the electrical cord assembly is carried in the cavity. The seat and mated member are adapted to secure the electrical cord assembly in a non-rotating relationship with the body.

By way of example, the deadman control switch shown in prior art FIGS. 9 and 10 required the following assembly process:
1. Strip jacketing from cord 10 at end 12 to expose conductors 14.
2. Insert conductors 14 through clearance hole 16 on the cord boot 18.
3. Insert exposed conductors 14 through the holes 19, 20 provided in the tension disc 22.
4. Strip the ends of conductors 14 extending beyond the tension disc 22.
5. Apply structural solder to the tension disc 22.
6. Insert free end 26 of the cord through the cord boot until flange 24 is flush with the tension disc 22.
7. Insert boot and cord subassembly, free end 26 first, through the switch body 28, in through plug cavity 30 and out through the cord/boot hole 32.
8. Insert the conductors 14 through the switch hole 34 on the body.
9. Solder the conductors to contact points provided on the switch 36.

10. Apply adhesive to the exterior of the switch seat.
11. Insert the switch seat plug 38 into seat plug cavity 40 in the body 28.
12. Insert switch 36 into switch hole 34 in the body 28 and seat it in the seat 38.
13. Place dust cover insert 42 and dust cover 44 on the switch.
14. Press fit installed dust cover and dust cover insert into the switch hole 34.
15. Apply adhesive to the exterior of the boot plug 44.
16. Insert boot plug 44 into the plug cavity 30.
17. Assemble mechanical components (lever 46, hinge 48, safety button 50, spring release 52 and button screw 54).

The design of the subject invention greatly reduces the assembly procedure and complexity of the electrical/body subassembly of the switch while at the same time incorporating all of the desirable ergonomic features of deadman switch disclosed in my aforementioned application Ser. No. 11/338,154. Specifically, the lever actuated switch is ergonomically designed to reduce fatigue and strain on the operator. The switch body is shaped to fit comfortably in the hand of the operator, with the spring biased lever hinged for action to fit the natural movement of the hand. The detent button is sized and positioned for easily accommodating single-handed operation. The actuator lever is sized to fit comfortably in the hand, with the hinge mechanism positioned at the wrist end of the hand, providing a natural movement for hand when depressing and engaging the lever, for reducing stress and fatigue.

The design components and subassemblies of the subject invention permit more efficient assembly operations than that of the prior art design by incorporating molded components where possible, rather than assembled components made up of discrete parts. This both improves quality and also minimizes the labor required to assemble the electrical/body subassembly. In addition, the subassembly has incorporated new features that reduce the likelihood of wear and tear on the cord and electrical wiring.

Other objects, features and desirable characteristics of the deadman switch of the subject invention will be readily apparent from the accompanying drawings and description.

BRIEF DESCRIPTION OF THE DRAWINGS

FIG. 1 is a side view of the assembled deadman switch of the subject invention.

FIG. 2 is a top view of the assembled deadman switch shown in FIG. 1.

FIG. 3 is an exploded view of the deadman switch assembly.

DETAILED DESCRIPTION OF THE ILLUSTRATED EMBODIMENT

Figure 4:
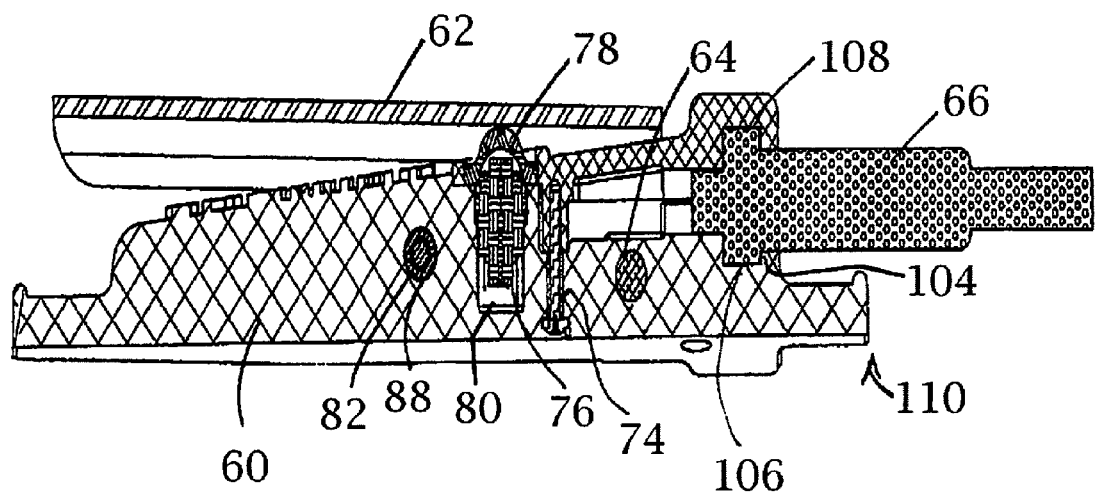
FIG. 4 is a sectional view taken generally along line 4-4 of FIG. 2.
Figure 5:
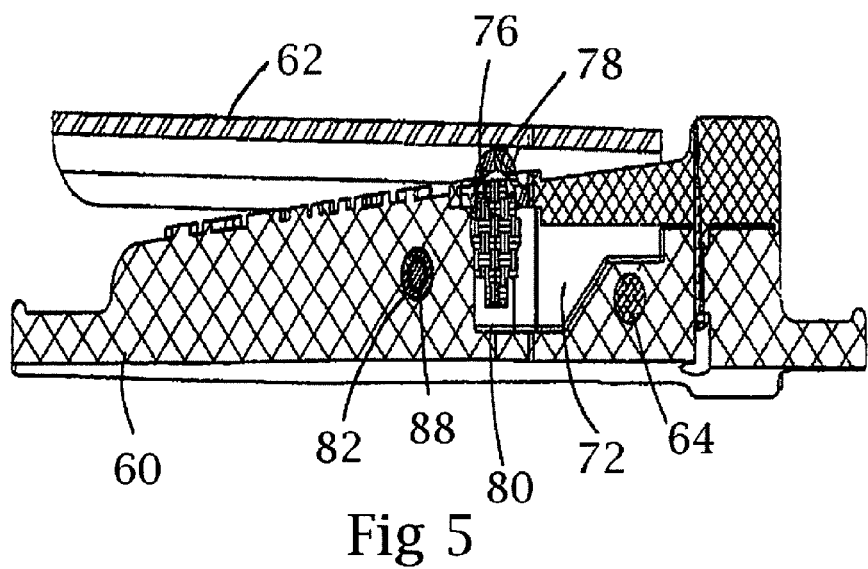
FIG. 5 is a sectional view taken generally along line 5-5 of FIG. 2.
Figure 6:
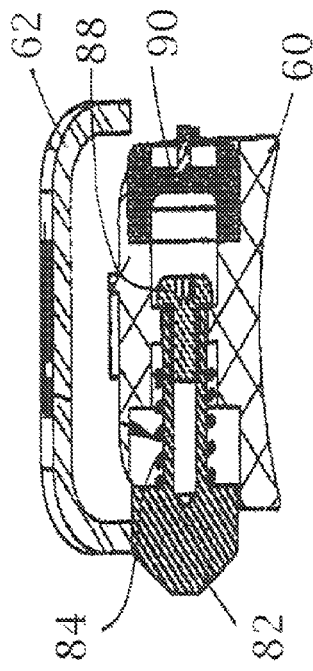
FIG. 6 is a sectional view taken generally along line 6-6 of FIG. 1
Figure 7:
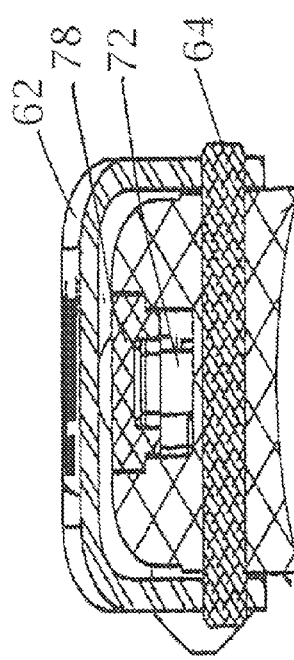
FIG. 7 is a sectional view taken generally along line 7-7 of FIG. 1.

The assembled deadman switch of the subject invention is shown in FIGS. 1 and 2. An exploded view showing all of the components of the switch is shown in FIG. 3. With specific reference to the drawings, FIGS. 1-7, the deadman switch includes a body 60 having an actuator lever 62 mounted by hinge 64 on body 60. The molded cord assembly 66 (see FIG. 8) is place in seat 68 (FIG. 3) and held in position by the body cover 70 which is secured to the body 60 in recess 72 by a plurality of body screws 74.

As best shown also in FIG. 3, the switch 76 and dust cover 78 are also designed to be held in assembled relationship by body cover 70 once properly positioned in switch recess 80 in the body. The safety button 82 and spring 84 are secured in the through hole 86 provided in the body 70 by means of the button screw 88 and protected against dust and debris by the dust cover 90.

Figure 8:
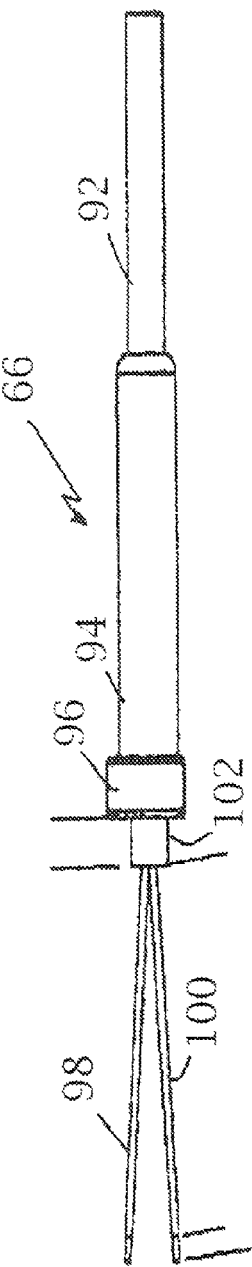
FIG. 8 is a side view of the molded cord, boot, flange assembly.

The molded cord assembly 66 is shown FIG. 8. The modular design incorporates a cord 92 with an integral boot 94 and mounting flange 96, with conductor wires 98 and 100 extending outwardly from the reduced end 102 of the mounting flange 96. As best shown in FIG. 3, the mounting flange 96 includes a flat 104 which is adapted to be seated in flat bottomed recess 106 (see also FIG. 4). This eliminates twisting of the cord assembly during use and reduces the likelihood that the conductor wires 98, 100 will break or become disconnected from the switch 76. The body cover 70 also include a recessed channel 108 for securely holding the cord assembly in place once the cover 70 is mounted on the body 60.

When the switch is fully assembled and in use, the cord end 110 of the switch is adjacent the wrist of the user, with the hinge 64 at the base of the hand rather than at the finger tips, incorporating the ergonomic features of my aforementioned patent application U.S. Ser. No. 11/338,154, which is incorporated herein by reference.

Figure 9:
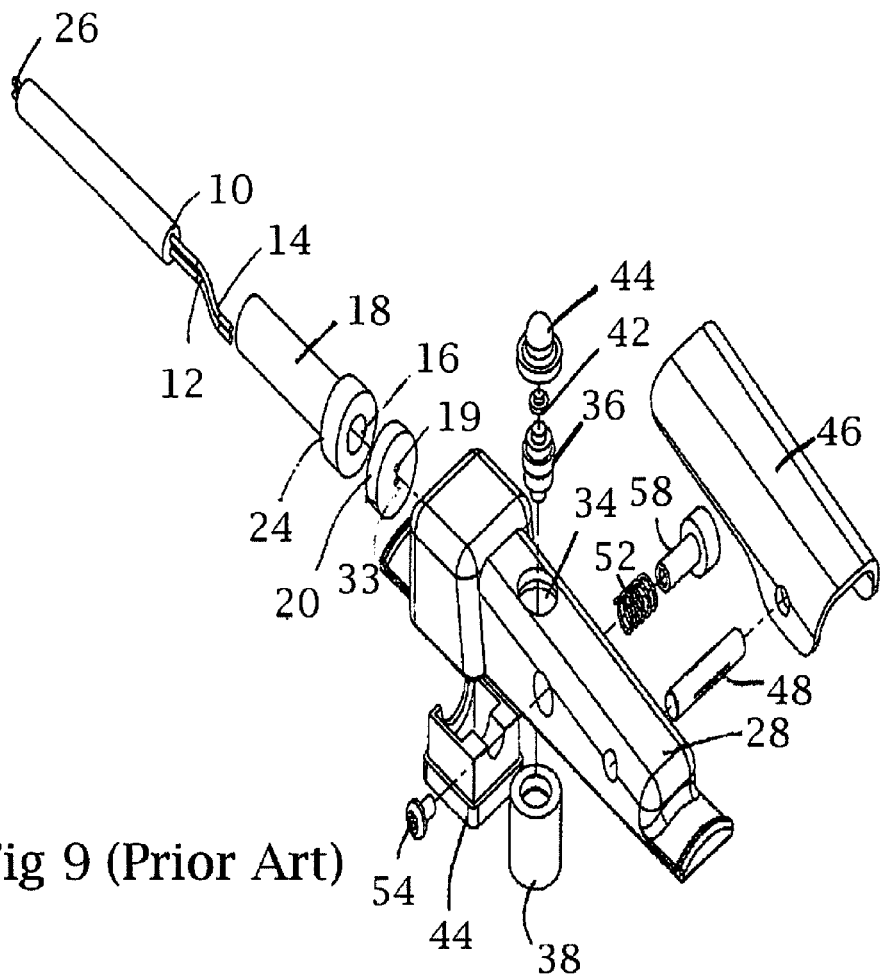
FIG. 9 (PRIOR ART) is an exploded view of a prior art deadman switch assembly.
Figure 10:
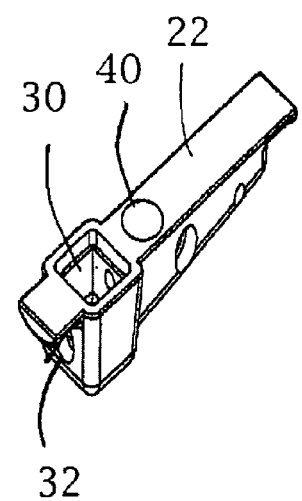
FIG. 10 (PRIOR ART) is a perspective view of the underside of the body of the prior art deadman switch assembly shown in FIG. 9.

It will be readily apparent that the switch design incorporated herein is both simpler to assemble and of a more robust configuration than that of the prior art switch shown in FIGS. 9 and 10. The assembly process is greatly simplified. In assembling the switch of the subject invention, the following steps are followed:

1. Strip the jacket of the overmolded boot 96 from the cord 66 to expose the conductor wires 98 and 99.
2. Solder the exposed conductor ends 98 and 99 to the switch leads (not shown) on switch 76.
3. Insert assembled switch 76 and overmolded cord assembly into the cavity 72 in the body 60, with the flat 104 on the boot positioned in the flat bottomed recess 106 in the body cavity.
4. Install body cover 70 and dust cover 78 on body 70 and over switch 76.
5. Secure the body cover, switch and cord assembly in place with screws 74.
6. Assemble mechanical components (lever 62, hinge 64, safety button 82, spring release 84 and button screw 88).

The electric deadman switch design of the subject invention improves assembly line type production over the designs of the prior art, enhancing consistent quality and minimizing the labor involved in assembly. In addition, by incorporating the flats in overmolded boot/cord assembly, longitudinal forces are transferred to switch body, reducing the stress on the conductor wires and the likelihood of creating an open electrical circuit due to disconnection of the conductor wires from the switch. The flats also eliminate twisting of the cord, further reducing the possibility of disconnecting the cord from the switch.

While certain embodiments and features of the invention have been described in detail herein, it should be understood that the invention includes all modifications and enhancements within the scope and spirit of the following claims.

What is claimed is:

1. A modular deadman switch for controlling the flow of a air/abrasive mix through a flow line, the modular deadman switch comprising:
   a. A body having a cavity, the cavity including an integral seat and a recess;
   b. An electrical activation switch assembly including an activation switch, the electrical activation switch adapted to be placed in the recess of the cavity;
   c. A lever handle mounted on a pivot hinge carded in the body, the lever handle movable between a release position and an engage position about the pivot hinge, wherein the lever handle is adapted for activating the activation switch when held in the engage position and for deactivating the activation switch when released to the release position;
   d. An electrical cord assembly adapted to be placed in the seat of the cavity, the electrical cord assembly having conductor wires connected to the switch when the electrical cord assembly and the activation switch assembly are respectively positioned in the recess and the seat, whereby activation of the switch by engaging the lever handle closes an electrical circuit and deactivation of the switch by disengaging the lever handle opens the electrical circuit;
   e. A body cover adapted to be placed over and closing the body cavity for securing the electrical cord assembly in the recess and the activation switch in the seat.

2. The deadman switch of claim 1, wherein the hinge is adjacent the electrical cord assembly end of the body when the electrical cord assembly is securing in the body by the body cover.

3. The deadman switch of claim 1, further including a biasing element for normally biasing the lever handle in the release position.

* * * * *